United States Patent
Richardson et al.

(10) Patent No.: US 10,035,498 B2
(45) Date of Patent: Jul. 31, 2018

(54) VEHICLE CAMERA CLEANING SYSTEM

(71) Applicant: FORD GLOBAL TECHNOLOGIES, LLC, Dearborn, MI (US)

(72) Inventors: Andrew Richardson, Ann Arbor, MI (US); James Robert McBride, Saline, MI (US); Gaurav Pandey, Ann Arbor, MI (US); Shane Elwart, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 277 days.

(21) Appl. No.: 14/692,796

(22) Filed: Apr. 22, 2015

(65) Prior Publication Data
US 2016/0311405 A1    Oct. 27, 2016

(51) Int. Cl.
| | |
|---|---|
| *B05B 7/08* | (2006.01) |
| *B08B 3/02* | (2006.01) |
| *B60R 1/00* | (2006.01) |
| *B60S 1/46* | (2006.01) |
| *B60S 1/48* | (2006.01) |
| *B60S 1/54* | (2006.01) |
| *B60S 1/56* | (2006.01) |

(Continued)

(52) U.S. Cl.
CPC .............. *B60S 1/56* (2013.01); *B05B 7/0815* (2013.01); *B08B 3/02* (2013.01); *B60R 1/00* (2013.01); *B60S 1/46* (2013.01); *B60S 1/48* (2013.01); *B60S 1/54* (2013.01); *B60S 1/60* (2013.01); *B60S 1/66* (2013.01); *G02B 27/0006* (2013.01)

(58) Field of Classification Search
CPC . B05B 7/0815; B08B 3/02; B60R 1/00; B60S 1/46; B60S 1/48; B60S 1/54; B60S 1/56; B60S 1/60; B60S 1/66; G02B 27/0006

USPC .......... 15/250.001; 134/26, 34, 36, 37, 94.1, 134/95.1, 95.2, 95.3, 99.1, 100.1, 102.1, 134/102.2, 103.2, 123, 198; 359/509
See application file for complete search history.

(56) References Cited

U.S. PATENT DOCUMENTS

| | | | | |
|---|---|---|---|---|
| 2010/0253597 | A1* | 10/2010 | Seder ....................... | B60R 1/00 345/7 |
| 2011/0073142 | A1* | 3/2011 | Hattori ................. | B60S 1/0848 134/56 R |
| 2013/0092758 | A1* | 4/2013 | Tanaka ..................... | B60S 1/56 239/284.1 |

FOREIGN PATENT DOCUMENTS

| | | |
|---|---|---|
| DE | 102010022163 A1 | 11/2011 |
| JP | 2001171491 A | 6/2001 |

(Continued)

OTHER PUBLICATIONS

Dan Mihalascu, Nissan Debuts Intelligent Self-Cleaning Rear View Camera on New Note [w/Video], Carscoops, Jun. 14, 2013, 6 pages. («http:www.carscoops.com/2013/nissan-debuts-intelligent-self-cleaning.html»).

*Primary Examiner* — Levon J Shahinian
(74) *Attorney, Agent, or Firm* — Frank A. MacKenzie; Brooks Kushman P.C.

(57) ABSTRACT

A vehicle camera cleaning system includes an air source and a computer processing unit configured to communicate with the air source. The air source is configured to apply an air flow to a lens of a camera. The camera includes a successive and repeated operational mode and non-operational mode. The computer processing unit includes a non-transitory computer readable medium having instructions to cause the computer processing unit to transmit a signal to the air source to actuate the air flow based on the camera being in the non-operational mode.

4 Claims, 3 Drawing Sheets

(51) Int. Cl.
  *B60S 1/60* (2006.01)
  *B60S 1/66* (2006.01)
  *G02B 27/00* (2006.01)

(56) References Cited

FOREIGN PATENT DOCUMENTS

| | | |
|---|---|---|
| JP | 2009083730 A | 4/2009 |
| JP | 2012201122 A | 10/2012 |
| WO | 2014010580 A1 | 1/2014 |

\* cited by examiner

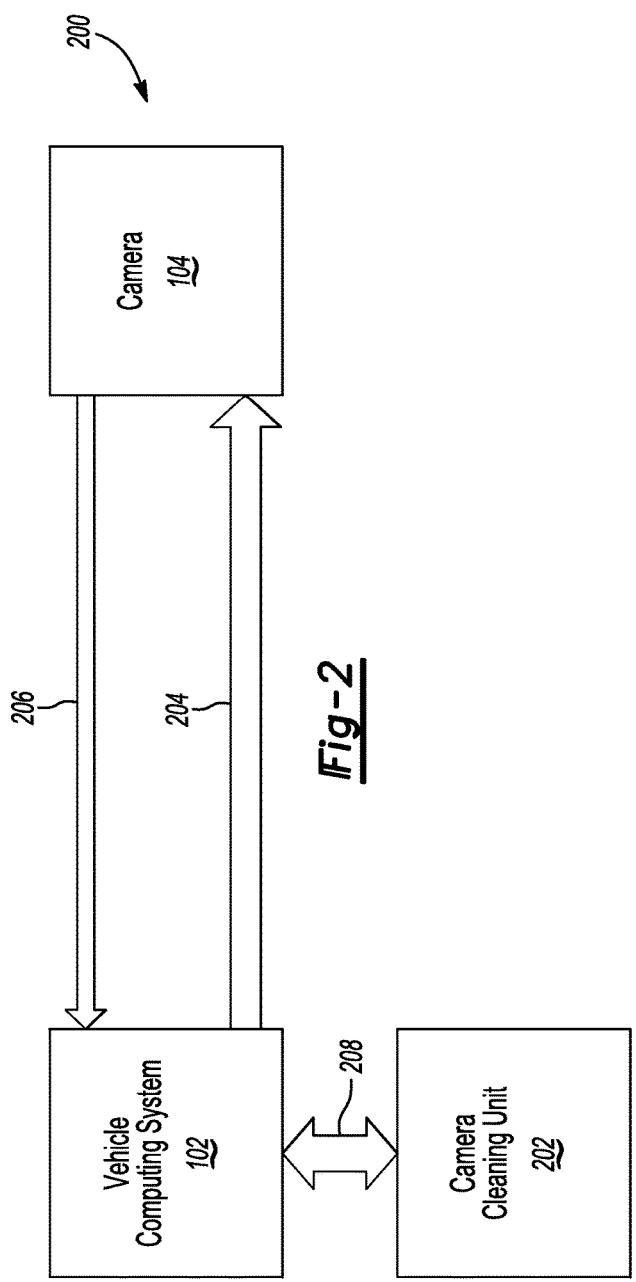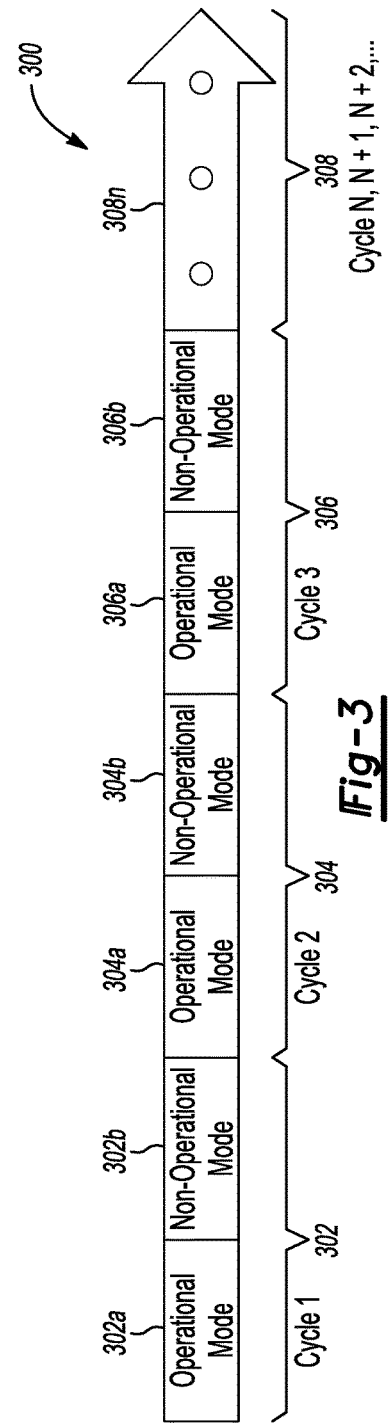

VEHICLE CAMERA CLEANING SYSTEM

TECHNICAL FIELD

This disclosure relates to a vehicle camera cleaning system, and in particular embodiments, includes an air flow activation component.

BACKGROUND

Many current vehicles provide information to a driver to actively or passively assist the driver. Certain driver assistance systems process information captured by sensors on the vehicle. Vehicle optical sensors are used as electronic driving aids to detect objects surrounding the vehicle. These sensors are integrated on the exterior of the vehicle for sensing objects near the vehicle. For example, a vehicle optical sensor may include a camera-based driver assistance system used as an electronic parking aid. The camera is integrated on the rear of the vehicle for recording images relating to space behind the vehicle. The camera is typically mounted to the outside of the vehicle which exposes the camera to environmental conditions. The functionality of the camera mounted on the outside of the vehicle may become compromised due to the buildup of film, grit and/or dirt on the camera lens. In order to prevent contamination in the camera's region, there exists a need for an appropriate camera cleaning system.

SUMMARY

In at least one embodiment, a vehicle camera cleaning system includes an air source and a computer processing unit configured to communicate with the air source. The air source is configured to apply an air flow to a lens of a camera. The camera includes a successive and repeated operational mode and non-operational mode. The computer processing unit includes a non-transitory computer readable medium having instructions to cause the computer processing unit to transmit a signal to the air source to actuate the air flow based on the camera being in the non-operational mode.

In at least one embodiment, a vehicle camera cleaning system includes an air source and a computer processing unit configured to communicate with the air source. The air source is configured to apply an air flow to a lens of a camera. The camera includes a blink rate. The computer processing unit includes a non-transitory computer readable medium having instructions to cause the computer processing unit to transmit a signal to the air source to actuate the air flow based on the blink rate.

In at least one embodiment, a vehicle camera cleaning system including a liquid solvent conduit, a compressed air conduit, an outlet conduit, and a two-way valve connecting the outlet conduit with the liquid solvent conduit and the compressed air conduit. The two-way valve includes a first position for delivering liquid solvent through the outlet conduit to a camera lens. The two-way value includes a second position for delivering compressed air through the outlet conduit to the camera lens.

BRIEF DESCRIPTION OF THE DRAWINGS

FIG. 2 illustrates a block diagram for a vehicle computing system in communication with a cleaning unit and a camera according to one embodiment;

FIG. 3 illustrates an acquisition schedule having a blink rate cycle for the camera.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In one or more embodiments, a cleaning system is disclosed that has a cleaning unit configured to provide air flow and/or a cleaning solution to a camera lens. The cleaning unit may include an air compressor to supply the air flow. The air flow may be applied across the camera lens to prevent debris buildup and/or remove debris from the lens. The cleaning unit may be further configured to provide the air flow at a predetermine airflow rate not to interfere with the camera's operation of capturing one or more images.

For example, the camera may have a blink rate that captures an image in a predefined amount of time. The cleaning unit may provide an air curtain (e.g., air flow for a predefined amount of time) based on the blink rate and while the camera is in a non-operational mode. The air curtain may apply continuous air flow for a predefined amount of time across the lens such that it provides a protective layer to prevent/remove debris from coming into contact with the lens. The air curtain is air flow being directed parallel or essentially parallel with the camera lens.

Figure 1:
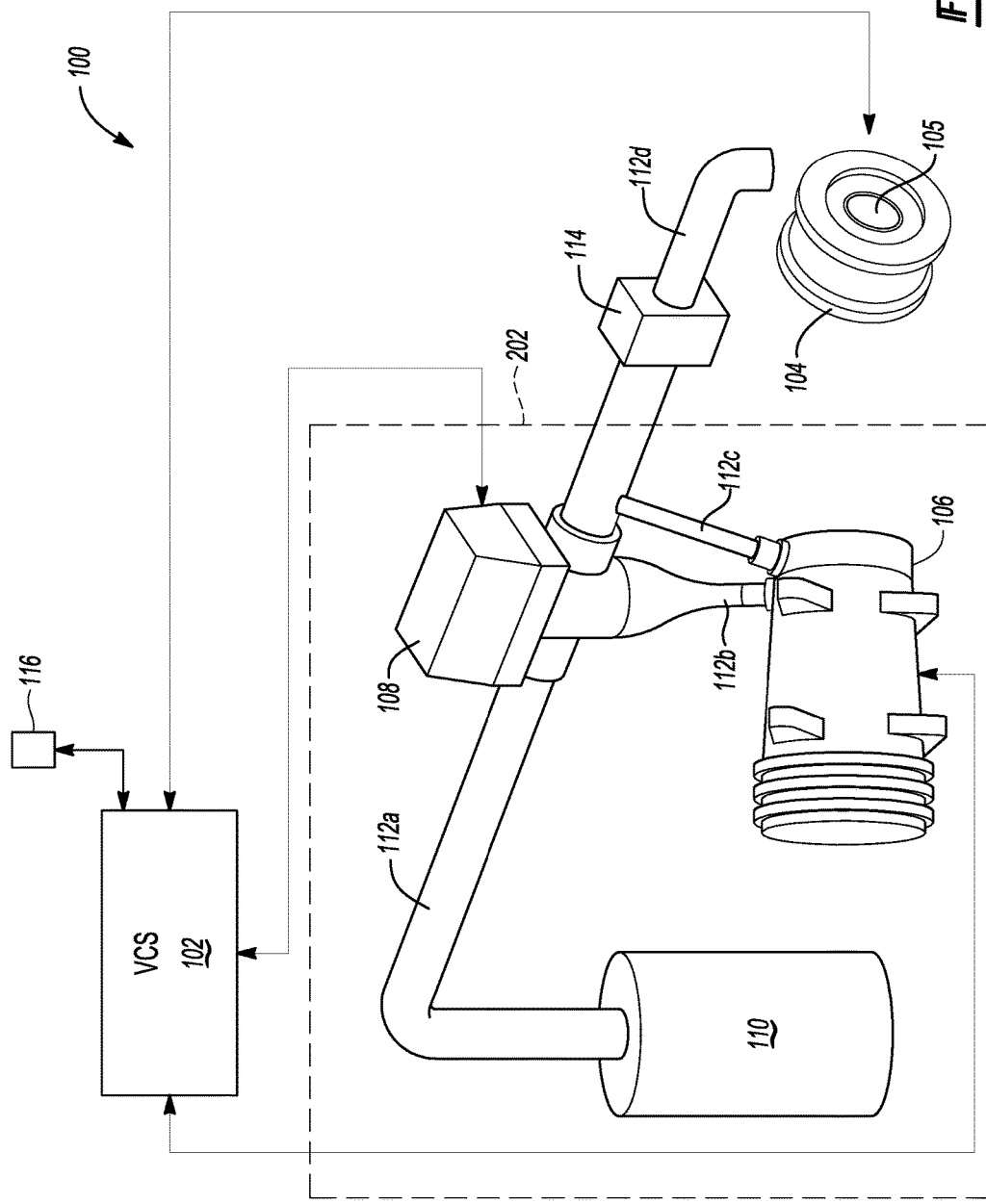
FIG. 1 illustrates a vehicle camera cleaning system according to one embodiment.

FIG. 1 illustrates a cleaning system 100 for a vehicle optical sensor 104 according to one embodiment. The cleaning system 100 may include a vehicle computing system (VCS) 102, a cleaning unit 202, and the vehicle optical sensor or camera 104 located on the exterior of the vehicle. The vehicle optical sensor 104 may include, but is not limited to, an electromagnetic sensor, ultrasonic sensor, radar sensor, etc.

The cleaning unit 202 may include a cleaning solvent reservoir 110, a compressor 106, and a valve 108. The compressor 106 may be configured as an air source for compressed air and a pump to deliver cleaning solvent. The compressor 106 may be configured with the valve 108 and one or more conduits 112a through 112d (collectively 112) to deliver an air flow generated by the compressor 106 and a cleaning solvent stored at the cleaning solvent reservoir 110 to the camera 104.

For example, the compressor 106 may be coupled to the valve 108 via a conduit 112b and configured to pump the cleaning solvent from the reservoir 110 via a liquid solvent conduit 112a. The compressor 106 may deliver the cleaning solvent to the camera 104 through an outlet conduit 112d coupled to the valve 108. In another example, the compressor 106 may be configured with the valve 108 to deliver air flow to the camera 104 via a compressed air conduit 112c coupled to the outlet conduit 112d.

The valve 108 may include a two-way valve configuration coupled to the outlet conduit 112d. The two-way valve configuration may deliver to the camera 104 at least one of the cleaning solvent and air flow based on a position of the valve via the outlet conduit 112d. The outlet conduit 112d may be configured with one or more nozzles positioned near a region of the camera 104. The two-way valve 108 may have a first position for delivering the cleaning solvent through the outlet conduit 112d and a second position for delivering compressed air through the outlet conduit 112d. The valve 108 may be configured to provide compressed air storage for received air generated by the compressor 106. The compressed air storage at the valve 108 may allow the air flow to be delivered to camera 104 without starting the compressor and/or to satisfy the temporary air flow demand to the camera 104. For example, stored compressed air at the valve 108 may be released based on a command to open the valve 108 from the VCS 102. The cleaning system 100 may deliver the air flow to the camera 104 in an ultrasonic pulse using, but not limited to, the one or more components illustrated in FIG. 1.

The valve 108 may be configured to provide an amount of pressure to assist in delivering the cleaning solvent received from the reservoir 110. The pressurized cleaning solvent may be delivered to the camera via the outlet conduit 112d based on the position of the valve 108. The position of the valve 108 may be controlled by the VCS 102.

The VCS 102 may include a processor that controls at least some portion of the operation of the vehicle camera cleaning system 100. Provided within the vehicle, the processor allows onboard processing of commands and routines. Further, the processor is connected to both non-persistent and persistent storage. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

As illustrated, the system 100 may include a camera 104 communicating with the VCS 102. The camera 104 may include a successive and repeated operational mode and non-operational mode. The camera may be configured to perform a cycle of one successive operational and non-operational mode in a predefined amount of time. The cycle performed in the predefined amount of time may be known as the camera's blink rate. The VCS 102 may monitor the camera 104 operation condition by determining whether the camera 104 is in the operational or non-operational mode. For example, the VCS 102 may receive from the camera 104 an acquisition schedule that includes the blink rate and whether the camera is in the operation or non-operation mode. The VCS 1 may control the cleaning unit 202 by transmitting one or more messages to the valve 108 and compressor 106 based on the acquisition schedule.

The VCS 102 may have one or more applications being executed at the processor to control the vehicle camera cleaning system 100. The one or more applications may include instructions to deliver the air flow generated by the cleaning unit 202 based on the camera 104 being in a non-operational mode. The one or more applications may also determine whether debris is at the camera lens 105 based on the quality of the captured image. The application may contain software to determine debris at the lens 105 based on brightness, clarity, object recognition, and/or a combination thereof. For example, if the application detects moisture and/or dirt on the lens 105 of the camera 104, the application may transmit a message to the cleaning unit 202 to deliver at least one of cleaning solvent and air flow to the camera 104. In another example, the application may delay the delivery of the cleaning solvent and/or air flow based on the camera being in an operation mode.

In one embodiment, the system 100 may include an ultra-bright LED and/or similar illumination device (not shown) coupled to the camera 104. The system 100 may illuminate the region of the camera 104 to detect whether debris is located on the lens 105. For example, the ultra-bright LED may illuminate the debris every few frames at a low rate. The VCS 102 may process the image with the assistance of the illumination to detect if debris is located on the lens.

The cleaning unit 202 may include a heating device 114 to provide heated air and/or heated fluid to the camera 104. The heating device 114 may include a circuit configuration to generate heat. The heating device 114 may be coupled to the cleaning unit 202. In one example, the VCS 102 may monitor a temperature sensor 116 to determine whether the exterior temperature falls below a predefined threshold. If the temperature falls below the predefined threshold, the VCS 102 may transmit a message to enable the heating device 114 to heat the air flow and/or cleaning solvent being delivered to the camera 104.

In another embodiment, the heating device 114 may include an existing vehicle component that generates heat and is coupled to the cleaning unit 202. For example, the heating device 114 may include, but is not limited to, the cleaning unit 202 configured with a heating path coupled with the exhaust system of the powertrain. In another example, the heating device 114 may include, but is not limited to, the cleaning unit 202 configured with a heating path coupled with the engine coolant system of the powertrain.

FIG. 2 illustrates a block diagram 200 for the VCS 102 in communication with the cleaning unit 202 and the camera 104 according to one embodiment. As shown by the block diagram 200, the VCS 102 may communicate 208 with the cleaning unit 202 based on the camera 104 blink rate and/or current camera operation mode. The VCS 102 may control the operation of the cleaning unit 202 based on the information being received 206 from the camera 104.

The VCS 102 may transmit 204 a request to the camera 104 for the blink rate and the current camera mode (e.g., operational or non-operational mode). The VCS 102 may receive 206 a message from the camera 102 that provides the blink rate and the current camera mode. The VCS 102 may communicate 208 with the cleaning unit 104 to deliver air flow and/or cleaning solvent to the camera lens 105 region based on the blink rate and the current camera mode.

The VCS 102 may control the air flow to be delivered in a pulse pattern based on the blink rate. For example, the VCS 102 may transmit a message to the cleaning unit 202 to provide compressed air to the camera lens 105 during the non-operational mode of the camera 104. The VCS 102 may manage delivery of cleaning solvent and/or air flow during the non-operational mode of the camera 104. The VCS 102 may manage the cleaning unit 202 to allow the camera to perform without interference from the delivered air flow and/or cleaning solvent. The air flow delivered to the region of the camera 104 in a pulse pattern may prevent debris from being collected around the camera lens 105. The air flow delivered during the non-operational mode may allow the camera to continue to capture one or more images without having interference from the cleaning unit 202.

In another example, the VCS 102 may detect debris buildup at the lens 105 of the camera 104. In response to the detected debris buildup, the VCS 102 may determine that the cleaning unit 202 may have to provide a cleaning duration to deliver the cleaning solvent and/or air flow to the lens 105 that exceeds the non-operation mode. The VCS 102 may transmit a message to the cleaning unit 202 to provide cleaning solvent and/or air flow to the region of the camera lens 105 exceeding the non-operational mode. The cleaning unit 202 may transmit the cleaning solvent and/or air flow to the lens 105 of the camera 104 based on the received message from the VCS 102. The VCS 102 may ignore the data received from the camera during the cleaning duration exceeding the non-operational mode. The VCS 102 may continue to process the data received from the camera 104 based on a cleaning complete message from the cleaning unit 202.

FIG. 3 illustrates the acquisition schedule having a blink rate cycle 300 for the camera 104. The camera 104 may operate based on the blink rate cycle 300 defining the amount of time to capture an image. For example, the camera 104 may acquire images during an operational mode 302*a* of a cycle 302. A non-operation mode 302*b* of the cycle may provide an opportunity for the cleaning unit 202 to deliver air flow across the lens 105 of the camera 104.

The VCS 102 may control the cleaning unit 202 based on the blink rate cycle 300 of the camera 102. For example, the cleaning unit 202 may provide an air flow pulse based on the non-operational mode 302*b*, 304*b* and 306*b* of each cycle 302 through 306 of the camera 104. In another example, the VCS 102 may detect debris in an image captured during an operational mode 302*b* of a cycle 304. In response to the detected debris, the VCS 102 may determine that the cleaning unit 202 may provide a clean duration exceeding a non-operation mode 304*b* of the cycle 304. The VCS 102 may transmit a request for the cleaning unit 202 to provide cleaning solvent and air flow during the operational mode 306*a* and non-operational mode 306*b* of a cycle 306. The VCS 102 may disregard the data generated during the operational mode 306*a* based on the cleaning duration.

In another embodiment, the VCS 102 may detect debris at the lens 105 of the camera during operation mode 302*a* and save an image of the detected debris in memory. The VCS 1 may transmit a message to the cleaning unit 202 to provide cleaning solvent and air flow to the lens 105 region of the camera to remove the debris during operational mode 304*a* 306*a* and non-operation mode 304*b* 306*b*. The VCS 102 may disregard the images received during the cycle 304 and 306 to remove the debris. The VCS 102 may receive an image from the camera 104 during operational mode 308*n* and compare the image to the image of the detected debris during operational mode 302*a* to determine if the debris is removed. In response to the compared images, the VCS 102 may determine whether the debris is removed at the lens 105 and if the cleaning unit 202 may need to perform another cleaning duration to attempt to remove the debris.

Figure 4:
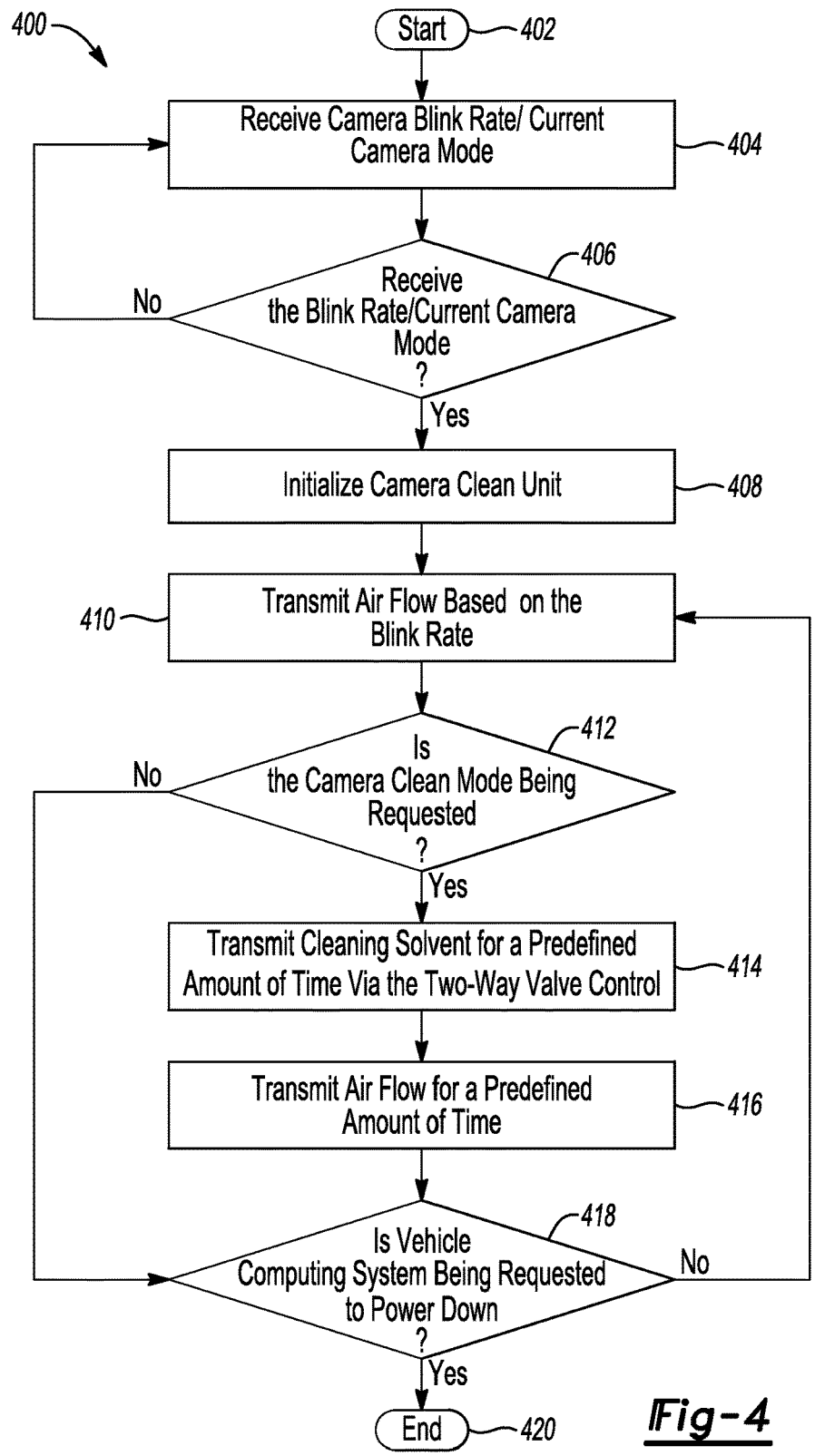
FIG. 4 illustrates an exemplary method for control of the cleaning system via the vehicle computing system.

FIG. 4 illustrates an exemplary method for control of the cleaning unit 202 via the VCS 102. The method 400 may be implemented using software code contained within the VCS 301. In other embodiments, the method 400 may be implemented in other vehicle processors, or distributed among multiple processors in communication with the VCS 301.

Referring again to FIG. 4, the cleaning system 100 and its components illustrated in FIG. 1 and FIG. 2 are referenced throughout the discussion of the method to facilitate understanding of various aspects of the present disclosure. The method 400 of preventing accumulation of debris, removing unwanted matter and cleaning the camera lens may be implemented through a computer algorithm, machine executable code, or software instructions programmed into a suitable programmable logic device(s) of the vehicle, such as the vehicle control module having at least one processor, another control module having a processor in communication with the vehicle computing system, or a combination thereof. Although the various operations shown in the flowchart diagram 400 appear to occur in a chronological sequence, at least some of the operations may occur in a different order, and some operations may be performed concurrently or not at all.

In operation 402, the cleaning system 100 may execute a camera cleaning method 400 based on a power on request of the VCS 102. For example, the VCS 102 may be initialized based on a key-on request of a vehicle ignition system. The camera cleaning method 400 is not limited to cleaning a camera lens and may be applied to other sensors located at the exterior of the vehicle. The camera cleaning method 400 may be executed based on a request to enable the camera for assisting the driver. The VCS 102 may communicate with the camera 104 and the cleaning unit 202 to execute the camera cleaning method 400. In response to established communication with the camera 104, the VCS 102 may receive a camera blink rate and/or the current camera mode in operation 404.

In operation 406, the VCS 102 may determine if the camera blink rate and/or camera mode was received from the camera 104. In response to the received blink rate and/or the camera mode, the VCS 102 may initialize the camera clean unit in operation 408. For example, the VCS 102 may transmit a message to the camera requesting the blink rate cycle to calculate a control strategy for the air flow delivery to the camera 104 via the cleaning unit 202.

In operation 410, the VCS 102 may transmit an air flow pulse rate to the cleaning unit 202 based on the blink rate. For example, the VCS 102 may control the cleaning unit 202 to deliver air flow to the camera lens during non-operational modes of the camera. In another example, the cleaning unit 202 may schedule an air flow delivery rate based on the blink rate and/or current camera mode.

In operation 412, the VCS 102 may determine if the camera clean mode is being requested based on detected debris at the camera. For example, the VCS 102 may determine that debris is obscuring the camera lens based on the received camera data. The VCS 102 may compare one or more images to determine if debris is detected. The VCS may detect debris based on comparing one or more images for brightness, clarity, object recognition, and/or a combination thereof. In another example, the camera may self-diagnose that debris is obstructing the lens and send over an error message via the current camera mode data. In response to the received error message, the VCS 102 may request cleaning solvent and/or air flow to the camera lens for a predefined amount of time. The predefined amount of time may exceed one or more cycles of the camera blink rate.

In operation 414, the VCS 102 may transmit a message to the cleaning unit 202 to deliver the cleaning solvent for a predefined amount of time via the two-way valve 108 and compressor 106. The VCS 102 may request the predefined amount of time for the cleaning solvent to exceed the non-operation mode cycle time received from the blink rate. The VCS 102 may disregard camera data received during the predefined amount of time the cleaning solvent is applied to the camera lens.

In operation 416, the VCS 102 may transmit a message to the cleaning unit 202 to deliver the air flow for a predefined amount of time via the two-way valve 108 and compressor 106. The VCS 102 may request the predefined amount of time for the air flow to exceed the non-operational cycle time received form the blink rate. The VCS 102 may disregard camera data received during the predefined amount of time the air flow is applied to the camera lens.

For example, in response to the clean mode being requested, the VCS 102 may store an image based on the detected debris. The VCS 102 may compare the stored image (e.g., a before cleaning mode image) of the debris to the image (e.g., an after cleaning mode image) received after the delivery of cleaning solvent and/or air flow to the camera lens. The VCS 102 may determine if the debris is removed based on the comparison of the before and after images.

In operation 418, the VCS 102 may determine if a power down is being requested. For example, the VCS 102 may be requested to power down based on a key-off request. In response to the power down request, the VCS 102 may store the one or more variable (e.g., blink rate) and/or images associated with the camera 104 in non-volatile memory in operation 420. If a power down request is not recognized, the VCS 102 may continue to control the camera cleaning method 400.

The camera cleaning method provides a strategy to prevent buildup of film, grit and/or dirt on the camera lens 105. The cleaning unit 202 may be configured with fewer components such that the delivery of the cleaning solvent and air flow may go through an outlet conduit via the compressor 106 and valve 108. The cleaning unit 202 configuration provides a solution to prevent buildup of cleaning solvent in the conduit based on the air flow being delivered in the same passage way. The cleaning system 100 pulse control of the air flow provides a strategy to minimize continuous interference of air flow with the performance of the camera.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle camera cleaning system comprising:
an air source for flowing air to a lens of a camera, the camera actuated according to periodic cycles, each defined by an operational mode followed by a non-operational mode, having a predefined duration defining a blink rate; and
a controller programmed to transmit a signal to the air source to actuate the air source in response to the camera being in the non-operational mode and the blink rate.

2. The vehicle camera cleaning system of claim 1, wherein the air source is configured with an air compressor coupled to a valve so that the signal controls the valve to actuate the air source.

3. The vehicle camera cleaning system of claim 2, wherein the air compressor provides heated air based on a temperature sensor value falling below a predefined threshold.

4. The vehicle camera cleaning system of claim 1, wherein the controller is further programmed to detect if debris is identified at the lens; and transmit the signal to the air source to actuate the air source for a predefined amount of time exceeding the non-operational mode.

* * * * *